US010260404B2

(12) United States Patent
Uehane et al.

(10) Patent No.: US 10,260,404 B2
(45) Date of Patent: Apr. 16, 2019

(54) ENGINE SUPERCHARGER

(71) Applicant: MAZDA MOTOR CORPORATION, Hiroshima (JP)

(72) Inventors: Yoshiyuki Uehane, Hiroshima (JP); Junji Umemura, Hiroshima (JP); Tomoaki Fujiyama, Iwakuni (JP); Koji Hadama, Hiroshima (JP); Makoto Mihara, Higashihiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 70 days.

(21) Appl. No.: 15/422,603

(22) Filed: Feb. 2, 2017

(65) Prior Publication Data
US 2017/0234211 A1    Aug. 17, 2017

(30) Foreign Application Priority Data

Feb. 16, 2016  (JP) .................................. 2016-026868

(51) Int. Cl.
*F02B 37/18* (2006.01)
*F01D 9/02* (2006.01)
*F01D 17/14* (2006.01)
*F01D 17/18* (2006.01)
*F01D 17/10* (2006.01)

(52) U.S. Cl.
CPC ............ *F02B 37/183* (2013.01); *F01D 9/026* (2013.01); *F01D 17/105* (2013.01); *F01D 17/148* (2013.01); *F01D 17/18* (2013.01); *F05D 2220/40* (2013.01); *Y02T 10/144* (2013.01)

(58) Field of Classification Search
CPC ........ F01D 9/026; F02B 37/025; F02B 37/183; Y02T 10/144
See application file for complete search history.

(56) References Cited

U.S. PATENT DOCUMENTS

2009/0280006 A1   11/2009  Thayer
2014/0109569 A1*   4/2014  Tsujita .................... F02D 23/00
                                                         60/599

FOREIGN PATENT DOCUMENTS

| CN | 103775250 A | 5/2014 |
| CN | 203584566 U | 5/2014 |
| JP | S61-62245 U | 4/1986 |
| JP | S63-51122 U | 4/1988 |
| JP | S64-41632 U | 3/1989 |
| JP | H02-105544 U | 8/1990 |
| JP | 2007-247560 A | 9/2007 |
| JP | 2012-107560 A | 6/2012 |
| JP | 2014-084757 A | 5/2014 |

* cited by examiner

*Primary Examiner* — Audrey K Bradley
(74) *Attorney, Agent, or Firm* — Studebaker & Brackett PC

(57) ABSTRACT

Disclosed herein is a technique for providing an engine supercharger of a reduced size allowing an exhaust gas to be introduced smoothly into a turbine scroll. A turbine for use in this supercharger includes: a turbine lead-in route, into which the exhaust gas is introduced; a turbine scroll formed continuously with the turbine lead-in route to allow the exhaust gas to swirl around inside; a turbine wheel to turn on an axis of rotation; a turbine lead-out route; a wastegate passage to bypass the exhaust gas around the turbine scroll; and a wastegate valve. The turbine lead-in route includes a throat portion having a tapered downstream portion. The wastegate passage branches from that throat portion.

17 Claims, 9 Drawing Sheets

ENGINE SUPERCHARGER

CROSS-REFERENCE TO RELATED APPLICATION

This application claims priority to Japanese Patent Application No. 2016-026868 filed on Feb. 16, 2016, the entire disclosure of which is hereby incorporated by reference.

BACKGROUND

The present disclosure relates to an engine supercharger to be mounted on vehicles such as motor vehicles.

To increase its output, a vehicle engine is sometimes provided with a turbocharger for supercharging the engine with pressurized air by utilizing the energy of its exhaust gas.

A turbocharger generally includes a turbine and a compressor as its major components. The turbocharger turns the turbine with an exhaust gas released from the engine to generate power that drives the compressor, thereby increasing the manifold air pressure.

The engine speed of a motor vehicle varies significantly according to its traveling condition. Thus, a turbocharger mounted on a motor vehicle is required to exhibit stabilized supercharging performance irrespective of the amount of exhaust gas released, which varies widely from a low-speed operating region where the amount of the exhaust gas released is relatively small through a high-speed operating region where the amount of the exhaust gas released is relatively large.

A turbocharger usually further includes a wastegate allowing the exhaust gas to be bypassed around the turbine to prevent the exhaust pressure from having an excessive impact on the turbine. That is to say, the turbocharger is normally configured to release the exhaust gas that has been bypassed around the turbine.

For example, in the engine 1 disclosed in Japanese Unexamined Patent Publication No. 2007-247560, its exhaust passage 6 is provided with a turbine 31, which is rotatably housed in a turbine housing 34. A wastegate 62 is arranged to have an inlet 621 upstream of the turbine 31 and an outlet 622 downstream of the turbine 31. A wastegate valve 63 is provided for the outlet 622. By controlling the degree of opening of the wastegate valve 63, the engine 1 regulates the feed rate of the exhaust gas to the turbine 31. The wastegate 62 forms an integral part of the turbine housing 34.

Meanwhile, Japanese Unexamined Patent Publication No. 2012-107560 discloses an engine in which a wastegate 10 is arranged in a cylinder head 2 assembled with a turbine housing 4. Specifically, the cylinder head 2 has a plurality of exhaust ports 6 communicating with a plurality of combustion chambers. These exhaust ports 6 are combined together at an exhaust port combining portion 7, and the combined exhaust port is connected to an exhaust inlet passage 26 inside the turbine housing 4 through an exhaust port outlet passage 8.

The wastegate 10 is arranged in parallel with the exhaust port outlet passage 8, and communicates with the exhaust port combining portion 7 and an exhaust outlet passage 28 inside the turbine housing 4. A wastegate valve for opening and closing the wastegate 10 is also provided inside the cylinder head 2.

A wastegate is generally arranged near a turbine to avoid increasing the size of the turbine that the gas needs to be bypassed around, and therefore, is often provided in the turbine housing as in Japanese Unexamined Patent Publication No. 2007-247560.

In that case, however, the wastegate passage branches from a point near a turbine scroll, thus possibly producing a turbulent flow of the exhaust gas at the branching point and eventually causing a decline in the turbine's driving force.

That is to say, a turbocharger has its turbine wheel turned by the exhaust gas introduced into, and swirling around inside, the turbine scroll. The rotational force of the turbine wheel drives a compressor, thus supercharging the engine with pressurized air. That is why the exhaust gas should be introduced into the turbine scroll smoothly enough to act on the turbine wheel as efficiently as possible.

However, branching the wastegate passage at a point near the turbine scroll would cause the exhaust gas to stagnate in the wastegate passage and produce a turbulent flow of the exhaust gas easily in the vicinity of the branching point while the wastegate valve is closed. Such a turbulent flow, produced just upstream of the turbine scroll, would block the exhaust gas from entering the turbine scroll smoothly. This hampers the exhaust gas from acting on the turbine wheel efficiently enough, thus eventually causing a decline in the turbine's driving force.

In the engine 1 of Japanese Unexamined Patent Publication No. 2007-247560, for example, while the wastegate valve 63 is closed, the exhaust gas stagnates in the wastegate 62 to produce a turbulent flow of the exhaust gas in the vicinity of the branching point. This turbulent flow blocks the exhaust gas from acting on the turbine 31 efficiently.

In this respect, in the engine of Japanese Unexamined Patent Publication No. 2012-107560, the wastegate is provided for the cylinder head, and therefore, the inlet of the wastegate passage may be arranged sufficiently distant from the turbine scroll while avoiding an increase in the size of the turbine. Thus, the exhaust gas may be introduced into the turbine scroll smoothly almost without being negatively affected by any turbulent flow of the exhaust gas produced in the vicinity of the branching point.

Actually, however, it is difficult to adopt such a configuration in which the wastegate passage is provided for the cylinder head, because the wastegate passage in the cylinder head would diminish the mechanical strength of the cylinder head, complicate its internal structure, and cause various other problems newly. In short, providing the wastegate passage for the cylinder head is more disadvantageous than providing it for the turbine housing.

It is therefore an object of the present disclosure to provide an engine supercharger of a reduced size allowing an exhaust gas to be introduced smoothly into a turbine scroll.

SUMMARY

The present disclosure relates to a supercharger for use in an engine with a turbine.

The turbine includes: a turbine lead-in route into which an exhaust gas released from respective cylinders of the engine is introduced; a turbine scroll arranged downstream of, and continuously with, the turbine lead-in route to allow the exhaust gas to swirl around inside; a turbine wheel housed in the turbine scroll so as to be turned around an axis of rotation by the exhaust gas; a turbine lead-out route communicating with the turbine scroll and allowing the exhaust gas that has left the turbine scroll to flow therethrough; a wastegate passage branching from the turbine lead-in route to communicate with the turbine lead-out route and allowing the exhaust gas to flow therethrough while being bypassed around the turbine scroll; and a wastegate valve configured to open and close a flow channel of the wastegate passage according to an operating state of the engine.

The turbine lead-in route includes: a gas combining portion arranged at an upstream point to combine exhaust gas flows together; and a throat portion arranged continuously with the gas combining portion and having a tapered downstream portion, and the wastegate passage branches from the throat portion.

Specifically, in this supercharger, the wastegate passage is arranged near the turbine around which the exhaust gas is bypassed, thus preventing the turbine from increasing its size excessively.

In general, branching the wastegate passage at a point in the vicinity of the turbine scroll would likely produce a turbulent flow of the exhaust gas just upstream of the turbine scroll while the wastegate valve is closed, thus possibly blocking the exhaust gas from being introduced smoothly into the turbine scroll. In this supercharger, however, the wastegate passage branches from the throat portion with a tapered downstream portion. That is why any turbulent flow of the exhaust gas produced in the vicinity of the branching point may still be rectified by a rectification passage before being introduced into the turbine scroll from the branching point. This alleviates a decline in the turbine's driving force involved with the production of such a turbulent flow. Consequently, even the wastegate passage branching at a point in the vicinity of the turbine scroll does not interfere with smooth introduction of the exhaust gas into the turbine scroll.

In an exemplary embodiment, the turbine lead-in route may further include a straight portion having a substantially constant flow cross section and arranged continuously with the throat portion and an inlet of the turbine scroll.

This configuration allows the exhaust gas flow, constricted by the throat portion, to be further rectified by the straight portion. Consequently, the exhaust gas may be introduced into the turbine scroll even more smoothly.

In this particular embodiment, the wastegate passage suitably branches from the downstream portion of the throat portion.

This configuration allows the exhaust gas flows released from the respective cylinders at different timings to be combined together at the gas combining portion before reaching the branching point of the wastegate passage. Thus, the turbine may be driven with good stability with dispersion in the turbine's driving force between the respective cylinders reduced.

In another embodiment, the wastegate passage may be arranged parallel to the straight portion.

This configuration allows the exhaust gas to flow smoothly through both of the wastegate passage and the straight portion even when the wastegate valve is opened.

In still another embodiment, the wastegate passage may communicate with the turbine lead-out route in the vicinity of the inlet of the turbine scroll, and the wastegate valve may be arranged at an outlet of the wastegate passage.

This configuration further reduces the size of the turbine housing by shortening the overall length of the wastegate passage to the point that the wastegate valve may be provided in the turbine lead-out route.

In yet another embodiment, if the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll, and an exhaust variable valve is provided upstream of the second lead-in route in order to vary a flow rate of the exhaust gas being introduced into the second lead-in route by changing its flow cross section, the wastegate passage may be provided for the second lead-in route.

This configuration allows an excessive exhaust gas to be bypassed around efficiently while preventing the wastegate passage from negatively affecting the exhaust gas flowing through the first lead-in route.

The present disclosure provides a supercharger of a reduced size that allows an exhaust gas to be introduced smoothly into a turbine scroll.

DETAILED DESCRIPTION

Embodiments of the present disclosure will now be described in detail with reference to the accompanying drawings. Note, however, that the following description is a mere example in nature and is not intended to limit the scope, application or uses of the present disclosure.

Also, in the following description, the direction will be defined with respect to the engine as in FIGS. 1 and 2. Specifically, the direction in which cylinders C are arranged in the engine body 1 will be hereinafter referred to as a "right and left direction," and the direction perpendicular to the former direction (i.e., the up and down direction in FIG. 1) a "forward and backward direction." One end of the engine on which the turbocharger 5 is provided will be hereinafter referred to as the "front end." The direction in which the centerline of each cylinder C extends (see FIG. 2) will be hereinafter referred to as an "up and down direction." Furthermore, it will be determined with respect to the flowing direction of an exhaust gas whether something is located "upstream" or "downstream" of something else.

(Engine)

Figure 1:
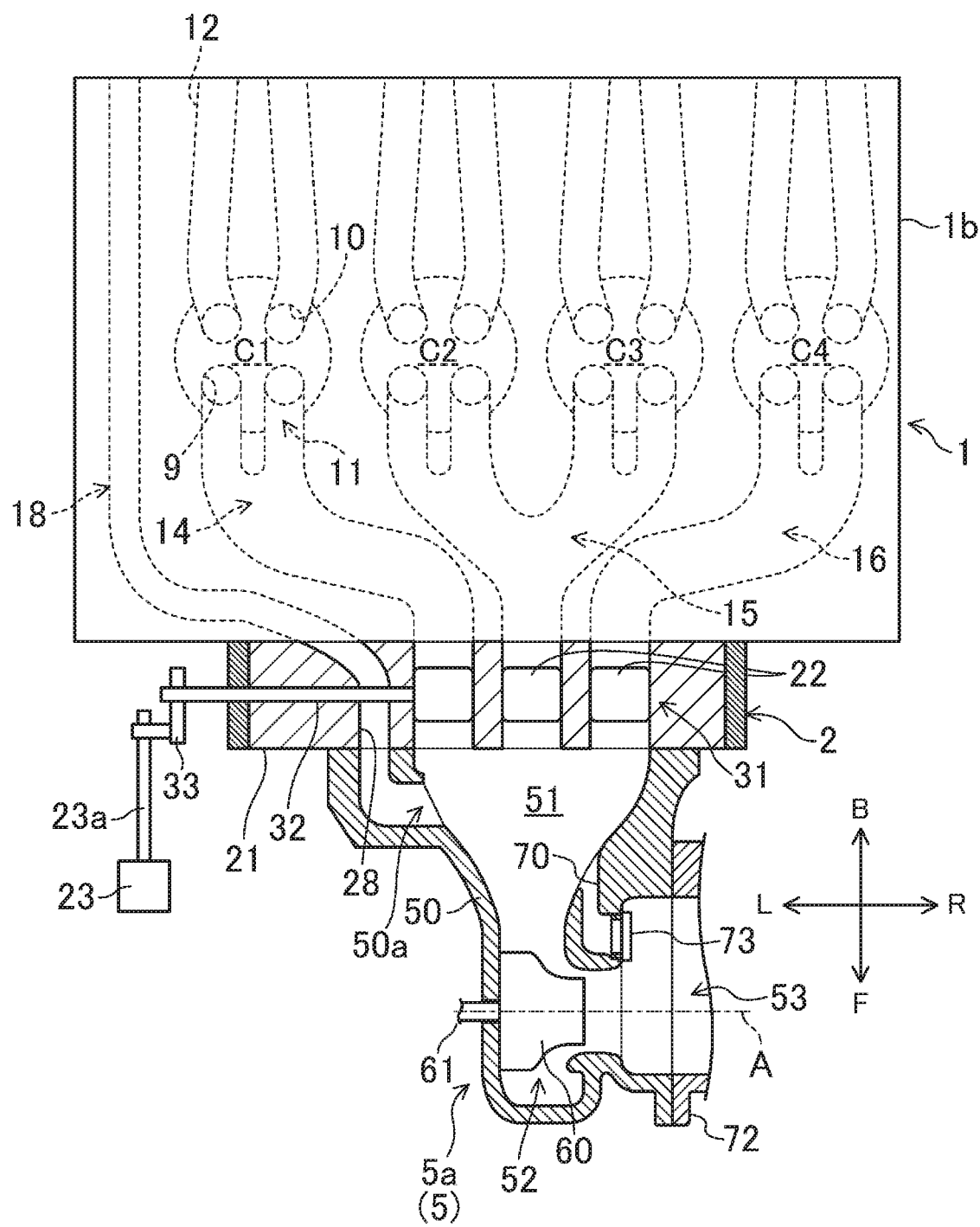
FIG. 1 schematically illustrates an engine equipped with a turbocharger according to an exemplary embodiment.
Figure 2:
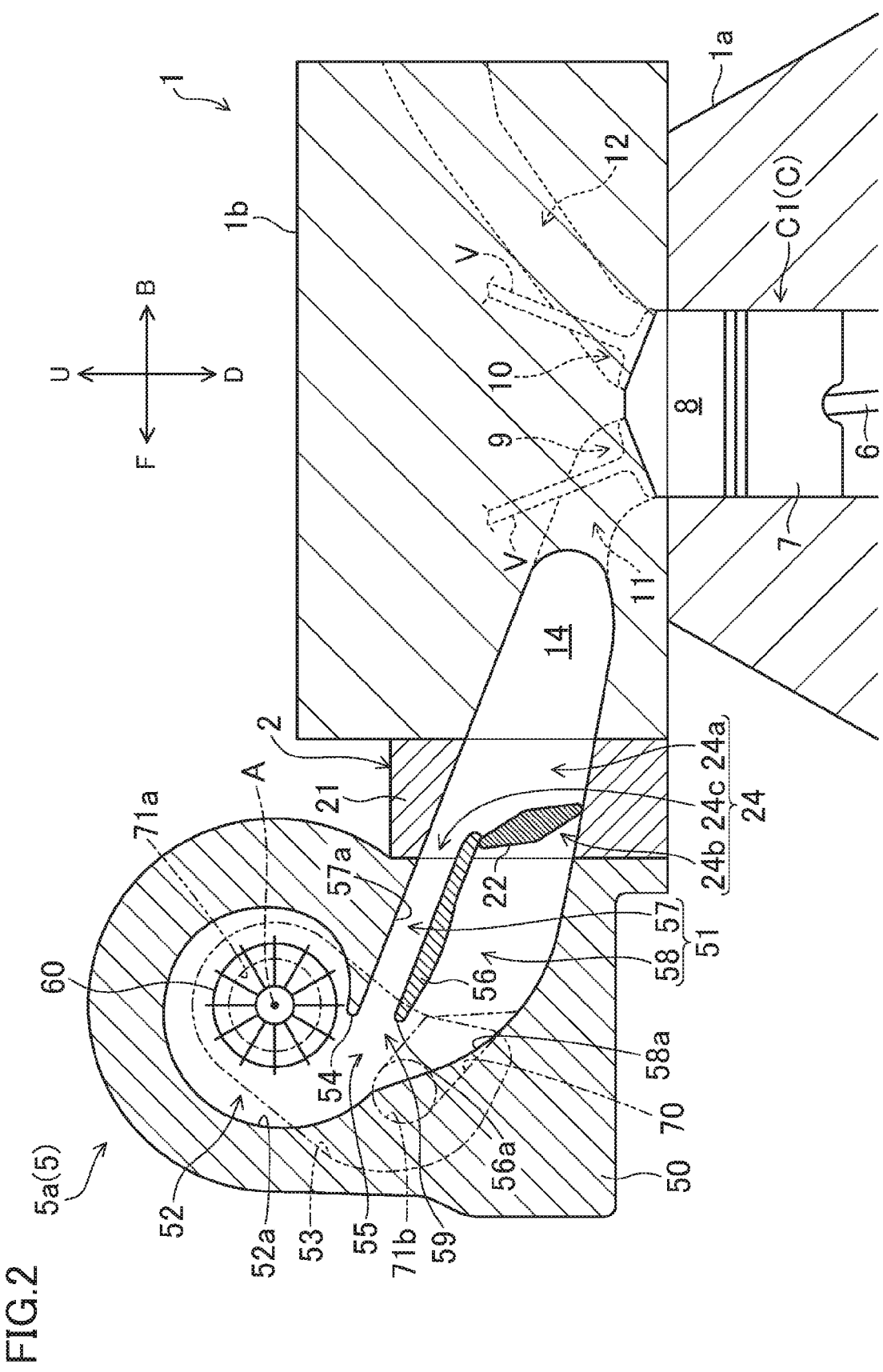
FIG. 2 schematically illustrates a vertical cross section of an engine equipped with a turbocharger according to an exemplary embodiment.

FIGS. 1 and 2 illustrate an exemplary engine equipped with a turbocharger 5 (hereinafter simply referred to as a "supercharger") to which the present disclosure is applied. This is an in-line four-cylinder, four-cycle engine to be mounted on a motor vehicle, and includes an engine body 1 comprised of a cylinder block 1a and a cylinder head 1b mounted on the cylinder block 1a. The cylinder head 1b is integrally assembled with an exhaust valve system 2 and the turbocharger 5.

Four columnar cylinders C, consisting of first, second, third, and fourth cylinders C1, C2, C3, and C4, are arranged to vertically extend from an upper portion of the cylinder block 1a and protrude into the cylinder head 1b. In this embodiment, the fuel is combusted in the order of the first, third, fourth, and second cylinders C1, C3, C4, and C2. Inside each of these cylinders C, housed slidably is a piston 7 coupled to a crankshaft (not shown) via a connecting rod 6. A combustion chamber 8 is defined by the top surface of the piston 7 and an upper portion of each cylinder C.

The top of the combustion chamber 8 has two exhaust vents 9, 9 and two suction vents 10, 10, each of which has its opened/closed states controlled by a valve V. Each exhaust vent 9 communicates with an exhaust port 11 cut through the cylinder head 1b to extend obliquely upward toward the front end. Each suction vent 10 communicates with a suction port 12 cut through the cylinder head 1b to extend obliquely upward toward the rear end. Although not shown, in the cylinder head 1b, an injector for injecting the fuel into the combustion chamber 8, a spark plug for igniting a spark in the combustion chamber 8, a valve control mechanism, and other members are also provided for each of these cylinders C.

The cylinder head 1b includes three independent exhaust passages 14, 15, and 16 provided for the four cylinders C1-C4. Specifically, a first independent exhaust passage 14 combines together the two exhaust ports 11, 11 for use to pass the exhaust gas released from the first cylinder C1. A second independent exhaust passage 15 combines together the four exhaust ports 11, 11, 11, 11 for use to pass the exhaust gas released from the second and third cylinders C2 and C3, which do not pass the exhaust gas in a continuous order. A third independent exhaust passage 16 combines together the two exhaust ports 11, 11 for use to pass the exhaust gas released from the fourth cylinder C4.

The second independent exhaust passage 15 has a Y-branched shape in its upstream portion so as to be used in common for the second and third cylinders C2 and C3. These independent exhaust passages 14, 15 and 16 are formed such that their downstream ends are aggregated together at approximately the center of the cylinder head 1b in the right and left direction and that their openings are arranged in line and adjacent to each other in the right and left direction at the front end of the cylinder head 1b.

The cylinder head 1b further includes an EGR downstream passage 18, which is formed to run forward through the cylinder head 1b on the left-hand side of the first cylinder C1 as shown in FIG. 1. The upstream end of this EGR downstream passage 18 has its opening located on the left of the independent exhaust passage 14 at the front end of the cylinder head 1b. On the other hand, the downstream end of the EGR downstream passage 18 has its opening located on the left of one of the suction ports 12 of the first cylinder C1 at the rear end of the cylinder head 1b.

This engine includes no independent part functioning as an exhaust manifold by itself, which constitutes a single exhaust passage integrating together a plurality of exhaust passages communicating with the cylinders C1-C4. Instead, the first, second and third independent exhaust passages 14, 15, 16 of the cylinder head 1b, first, second and third upstream exhaust passages 24, 25, 26 of the exhaust valve system 2, and a turbine lead-in route 51 of the turbocharger 5 cooperate with each other to form an exhaust manifold.

This engine is configured to increase the manifold air pressure of the intake air introduced into the respective cylinders C1-C4 by activating the turbocharger 5 with the exhaust gas released through the exhaust manifold. In addition, this engine is also configured to allow the turbocharger 5 to increase the engine torque effectively in a wide engine speed range from a low-speed region through a high-speed region by having the exhaust valve system 2, provided between the engine body 1 and the turbocharger 5, control the flow velocity and dynamic pressure of the exhaust gas introduced into the turbocharger 5 according to the traveling condition of the motor vehicle.

(Exhaust Valve System 2)

Figure 3:
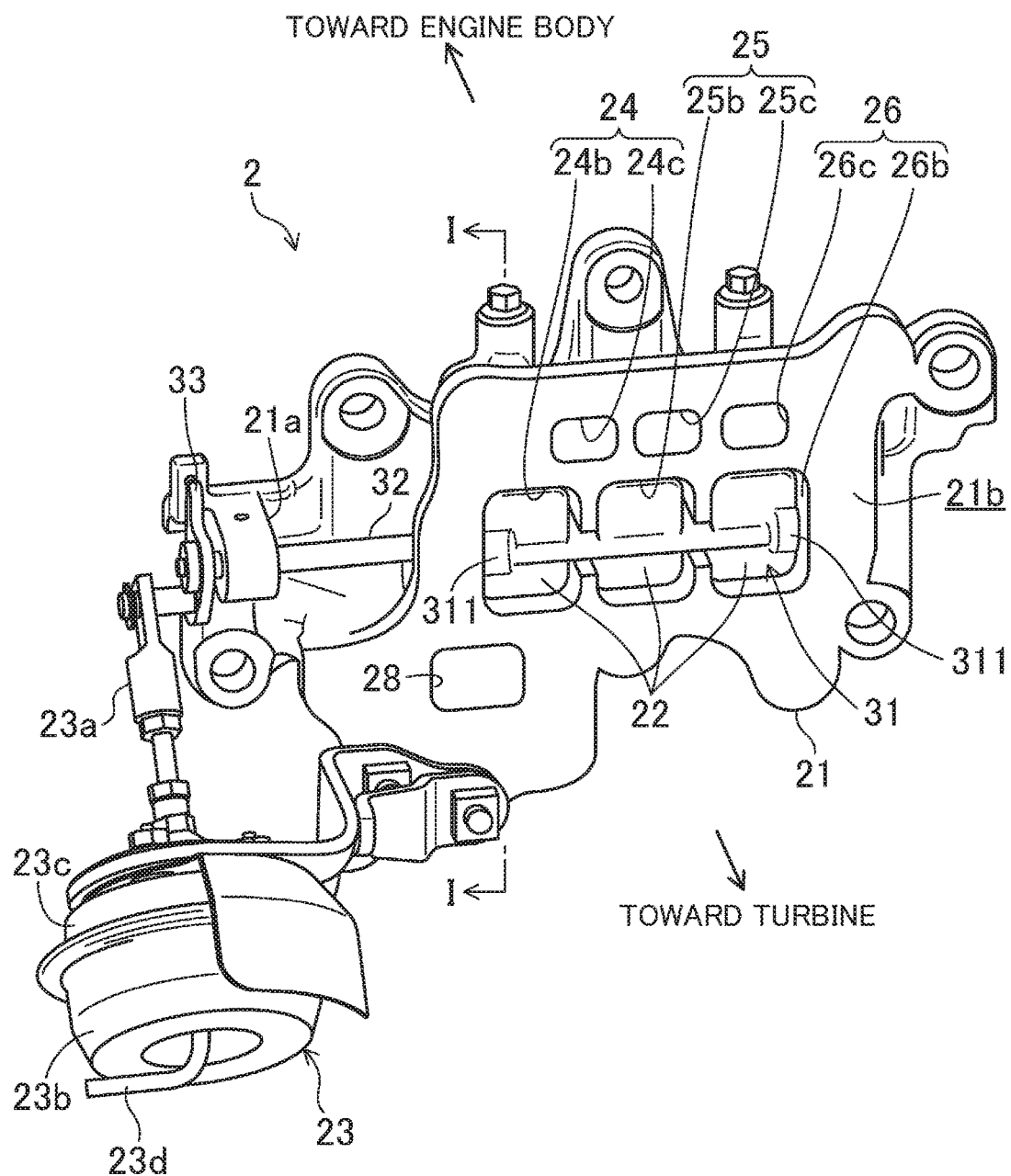
FIG. 3 is a perspective view of an exhaust valve system as viewed from a turbine.

FIG. 3 illustrates an exhaust valve system 2 as viewed from the turbine 5a. This exhaust valve system 2 is designed to change the flow velocity and dynamic pressure of the exhaust gas introduced into the turbocharger 5 by changing the flow cross section of the exhaust gas released from the engine body 1. The exhaust valve system 2 is secured to the front surface of the cylinder head 1b with bolts.

This exhaust valve system 2 includes a system body 21 configured as a metallic cast body, exhaust variable valves 22, and a negative pressure actuator 23. The system body 21 includes three independent upstream exhaust passages (hereinafter referred to as first, second and third upstream exhaust passages) 24, 25, 26 respectively communicating with the independent exhaust passages 14, 15, 16 of the cylinder head 1b, and an EGR intermediate passage 28 communicating with the EGR downstream passage 18 of the cylinder head 1b.

Figure 4:
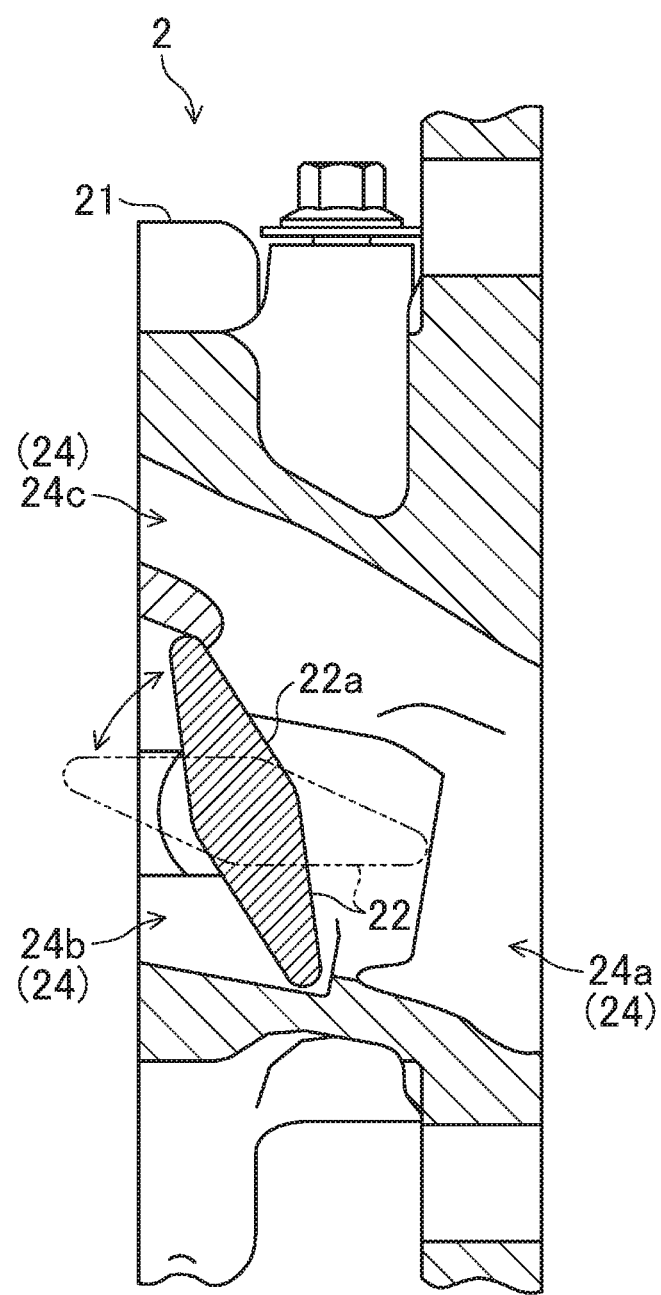
FIG. 4 is a cross-sectional view taken along the plane I-I shown in FIG. 3.

Each of these upstream exhaust passages 24, 25, 26 has a Y-branched shape in its downstream portion. Specifically, as shown in FIGS. 2, 3, and 4, the first upstream exhaust passage 24 includes a common passage 24a communicating with the first independent exhaust passage 14 of the cylinder head 1b, and high- and low-speed passages 24b and 24c functioning as lower and upper passages branching from this common passage 24a.

Although not shown, each of the second and third upstream exhaust passages 25 and 26 also includes a common passage 25a, 26a communicating with the independent exhaust passage 15, 16 of the cylinder head 1b, and high- and low-speed passages 25b, 25c and 26b, 26c functioning as lower and upper passages branching from this common passage 25a, 26a.

In each of the first, second and third upstream exhaust passages 24, 25, 26, the low-speed passage 24c, 25c, 26c is formed to have a smaller flow cross section than the high-speed passage 24b, 25b, 26b.

The high-speed passages 24b, 25b, 26b each have a generally rectangular cross section and are arranged in line in the right and left direction as shown in FIG. 3. Likewise, the low-speed passages 24c, 25c, 26c each also have a generally rectangular cross section and are arranged in line in the right and left direction above the high-speed passages 24b, 25b, 26b, respectively, as shown in FIG. 3.

On the other hand, as shown in FIGS. 1 and 3, the EGR intermediate passage 28 is provided at a left end of the system body 21. This EGR intermediate passage 28 has a generally rectangular cross section and is located on a lower left side of the high-speed passage 24b of the first upstream exhaust passage 24.

The exhaust variable valves 22 open and close the respective flow channels of the high-speed passages 24b, 25b, 26b of the upstream exhaust passages 24, 25, 26. The exhaust variable valves 22 are comprised of three butterfly valves provided for the respective high-speed passages 24b, 25b, 26b. These three exhaust variable valves 22, 22, 22 arranged side by side in the right and left direction are coupled together to form a valve body 31.

The valve body 31 is provided for the system body 21 so as to cross the respective centers of the transverse cross sections of the high-speed passages 24b, 25b, 26b. The valve body 31 is rotatably supported by the system body 21 via supporting portions 311 at right and left ends thereof.

As shown in FIGS. 3 and 4, the respective exhaust variable valves 22 have a rectangular plate shape corresponding to the cross section of their associated high-speed passages 24b, 25b, 26b. Each of the exhaust variable valves 22 has a blocking face 22a that blocks an associated one of these passages 24b, 25b or 26b when facing a downstream point.

Each exhaust variable valve 22 switches into either a state indicated by the solid profile in FIG. 4 where the high-speed passage 24b, 25b, or 25b is fully closed or a state indicated by the two-dot chain in FIG. 4 where the high-speed passage 24b, 25b, or 25b is fully opened.

Each exhaust variable valve 22 is designed such that its blocking face 22a tilts in the fully closed state. More specifically, the exhaust variable valve 22 is designed such that an upper portion of each blocking face 22a that blocks its associated high-speed passage 24b, 25b, 26b tilts toward a downstream end with respect to a lower portion thereof and that the exhaust gas collided against the blocking face 22a is smoothly guided toward the low-speed passage 24c, 25c, 26c. Each of these exhaust variable valves 22 is designed to have a normally open state.

A drive shaft 32 is coupled to a left end portion of the valve body 31 and is extended out of the left end of the upstream exhaust passages 24, 25 and 26. The extended portion of the drive shaft 32 is rotatably supported by an auxiliary bearing 21a, which forms an integral part of the system body 21, and a lever member 33 for regulating the rotation of the drive shaft 32 is attached to the tip end of the shaft 32. The lever member 33 is coupled to an output shaft 23a of the negative pressure actuator 23 via a pin.

As shown in FIG. 3, the negative pressure actuator 23 is located closer to the turbine 5a, and secured to the system body 21 via a bracket. The negative pressure actuator 23 includes a first casing 23b and a second casing 23c, which have been butt-joined together. The inner space of the negative pressure actuator 23 is partitioned by a diaphragm (not shown), to which the output shaft 23a is connected, into a negative pressure chamber located closer to the first casing 23b and a positive pressure chamber located closer to the second casing 23c.

A negative pressure tube 23d is connected to the bottom of the first casing 23b. A negative pressure at the engine manifold is applied to, or removed from, the negative pressure chamber through the negative pressure tube 23d, thus displacing the diaphragm. The displacement of the diaphragm in turn moves the output shaft 23a back and forth to turn the drive shaft 32.

That is to say, the negative pressure actuator 23 drives the respective exhaust variable valves 22 in rotation via the drive shaft 32, thereby opening and closing the respective high-speed passages 24b, 25b, 26b at the same time.

Figure 5:
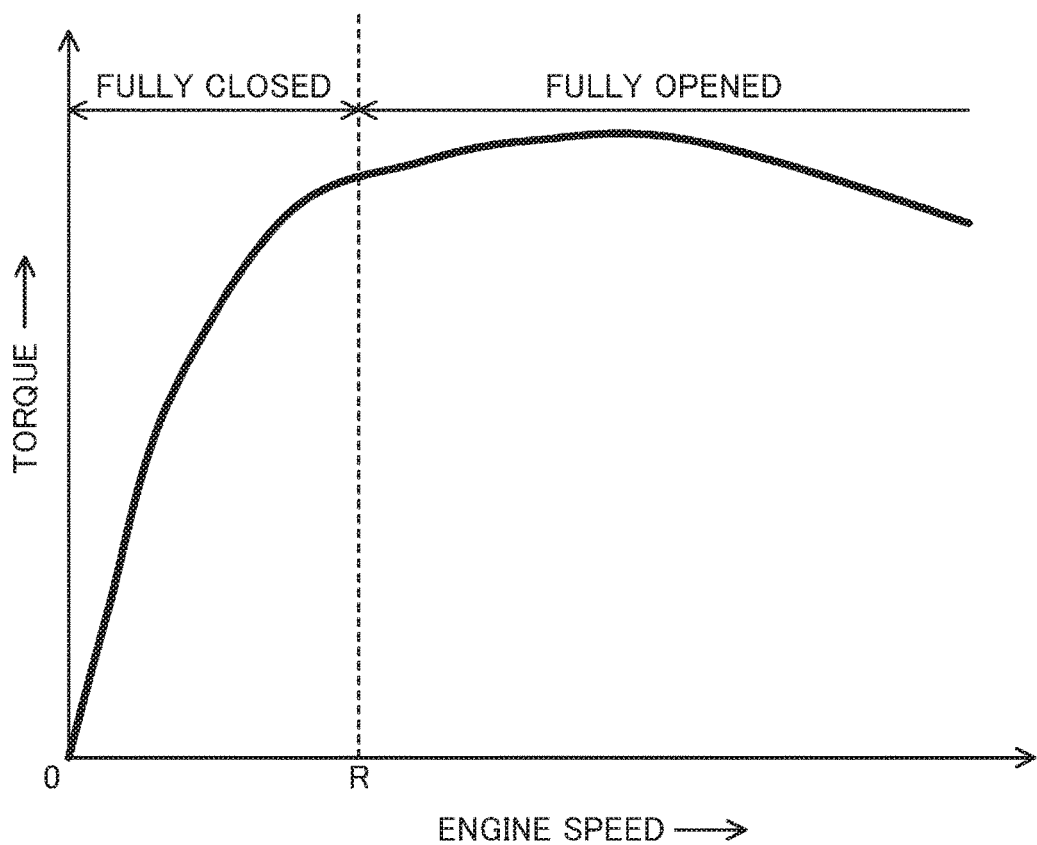
FIG. 5 is a graph showing the performance of an engine equipped with a turbocharger according to an exemplary embodiment.

As shown in FIG. 5, the respective exhaust variable valves 22 of this engine have their opened and closed states controlled so as to be fully closed when the engine speed is less than a preset number of revolutions R and fully opened when the engine speed is equal to or greater than the preset number of revolutions R. That is to say, a number of revolutions R (of 1600 rpm, for example) obtained empirically, for example, has been preset as control data for this engine, and the respective exhaust variable valves 22 are opened or closed at that preset number of revolutions R.

Also, the ratio of the flow cross section of each of the low-speed passages 24c, 25c, 26c to that of an associated one of the high-speed passages 24b, 25b, 26b is determined based on the preset number of revolutions R, i.e., the flow rate of the gas that can pass through these passages.

Thus, in the low-speed operating region where the engine speed is less than the preset number of revolutions R and the amount of the exhaust gas released is small, the exhaust gas can no longer enter any of the high-speed passages 24b, 25b and 26b, and all of the exhaust gas flowing through the common passages 24a, 25a and 26a enters the low-speed passages 24c, 25c, and 26c.

On the other hand, in the high-speed operating region where the engine speed is equal to or greater than the preset number of revolutions R and the amount of the exhaust gas released is large, the exhaust gas flowing through the common passages 24a, 25a and 26a enters all of the low-speed passages 24c, 25c, and 26c and high-speed passages 24b, 25b, and 26b.

Furthermore, in the high-speed operating region where the amount of the exhaust gas released is relatively large, a wastegate valve 73 (to be described later) is selectively opened and has its degree of opening adjusted according to the operating state of the engine. Specifically, when the exhaust pressure becomes equal to or greater than a preset upper limit value, the wastegate valve 73 is opened and has its degree of opening adjusted according to the amount of the exhaust gas released to prevent the exhaust pressure from having an excessive impact on the turbine 5b.

(Turbocharger 5)

The turbocharger 5 includes, as its major components, a turbine 5a and a compressor (not shown; arranged in an intake passage, for example). As shown in FIGS. 1 and 2, the turbine 5a is assembled with the cylinder head 1b with the exhaust valve system 2 interposed between them, and is comprised of a turbine housing 50, a turbine wheel 60, and other members.

Figure 6:
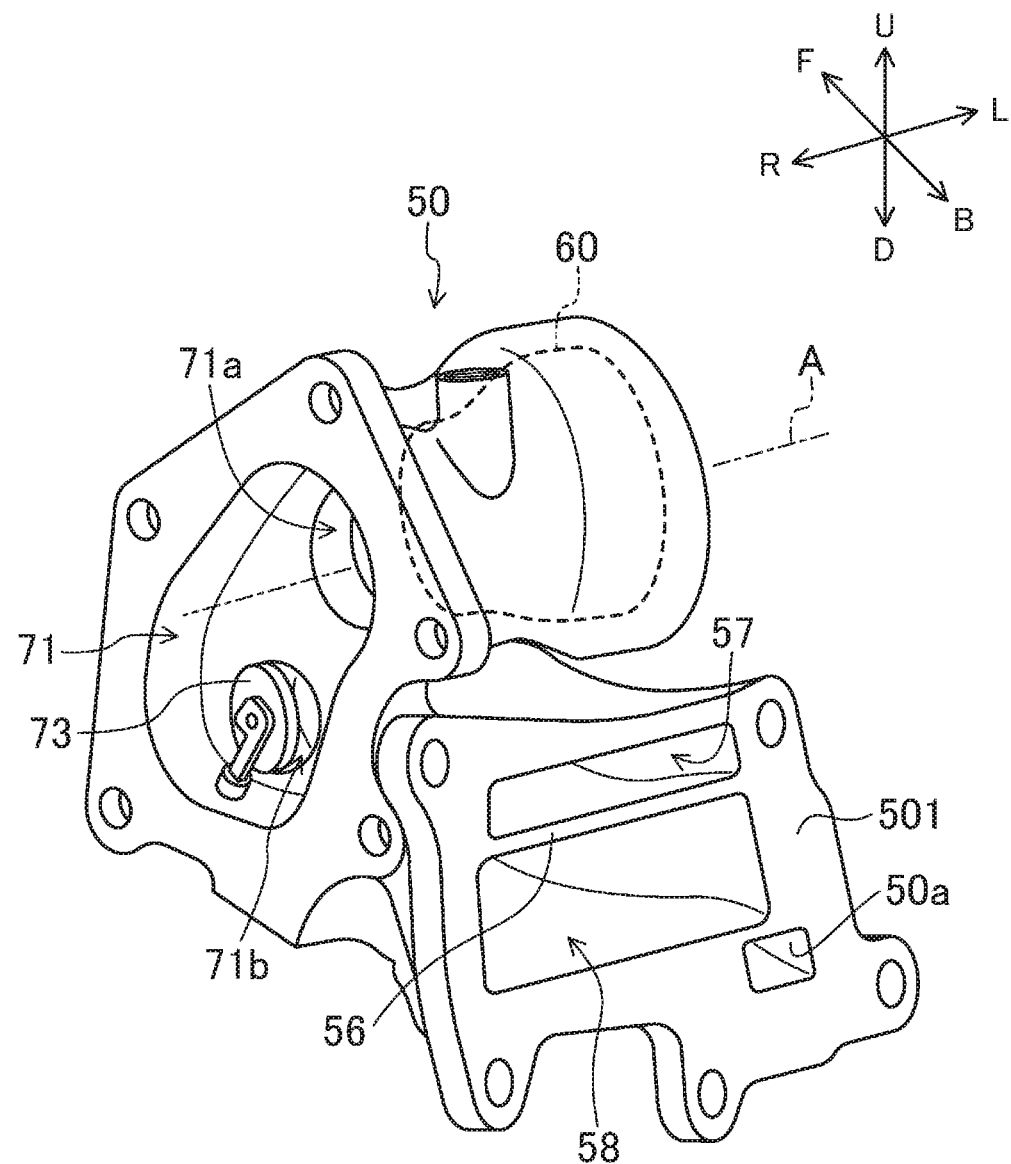
FIG. 6 is a perspective view illustrating a turbine housing.
Figure 7:
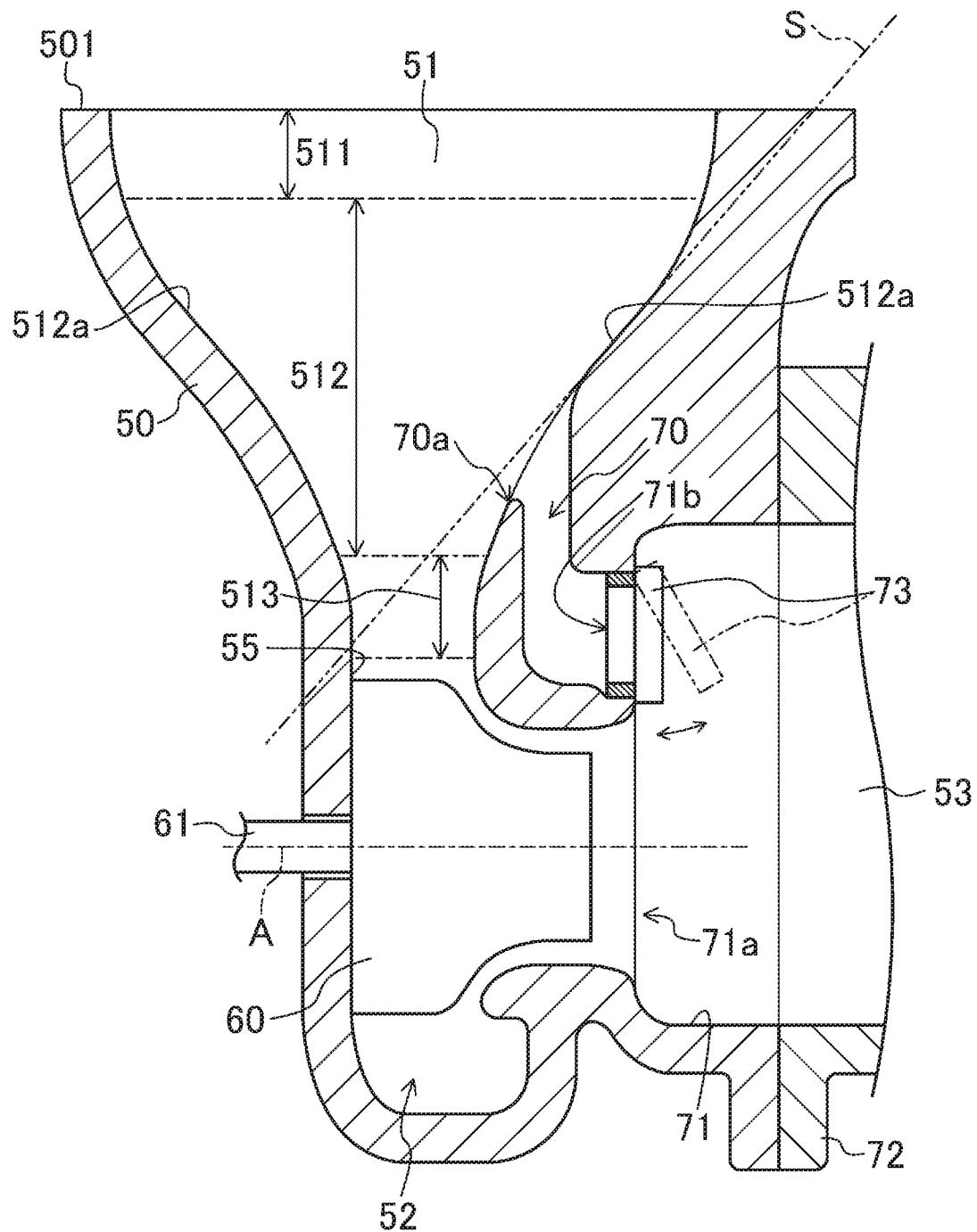
FIG. 7 is a schematic cross-sectional view illustrating a basic structure for a turbine.

As shown in FIG. 6, the turbine housing 50 includes a flange 501 to be butt-secured to the clamp face 21b of the system body 21 (see FIG. 3). As shown in FIG. 7, the turbine housing 50 houses a turbine lead-in route 51, a turbine scroll 52, a wastegate passage 70, a turbine lead-out space 71, and other members, passages, or spaces.

As shown in FIG. 1, an EGR upstream passage 50a, communicating with the EGR intermediate passage 28 of the exhaust valve system 2, is provided on the left-hand side of the turbine lead-in route 51. Part of the exhaust gas entering the turbine 5a is introduced, as an EGR gas, into the intake passage through the EGR upstream passage 50a, EGR intermediate passage 28, and EGR downstream passage 18. That is to say, in this engine, an EGR passage is formed by the EGR downstream passage 18, EGR intermediate passage 28, and EGR upstream passage 50a.

As shown in FIG. 2, the turbine scroll 52 is a vortex member communicating with a downstream portion of the turbine lead-in route 51 and causing the exhaust gas to swirl around inside, and is formed such that its peripheral wall portion 52a surrounds its axis of rotation A extending in the right and left direction.

A tongue portion 54 of the peripheral wall portion 52a of the turbine scroll 52, i.e., one end of the peripheral wall portion 52a where the turbine scroll 52 starts to whirl, is located under the axis of rotation A. The peripheral wall portion 52a extends from the tongue portion 54 while drawing a circular pattern toward the engine (i.e., backward) until just before completing one round about the axis of rotation A while gradually increasing its distance from the axis of rotation A. An opening (i.e., inlet 55 of the turbine scroll) for introducing the exhaust gas into the turbine scroll 52 is provided between the other end (i.e., a terminal portion) of the peripheral wall portion 52*a* where the turbine scroll 52 finishes whirling and the tongue portion 54.

The turbine scroll 52 is located above the respective cylinders C1-C4 of the engine and the turbine lead-in route 51 in the up and down direction. The turbine wheel 60 is housed in the turbine scroll 52 with its front side having a plurality of radial fins facing the passage.

A coupling shaft 61, extending through a left side portion of the turbine housing 50, is secured to the reverse side of the turbine wheel 60. The turbine wheel 60 is coupled to a compressor (not shown) via this coupling shaft 61, and is freely rotatable on the axis of rotation A. The turbine wheel 60 is turned by the exhaust gas swirling around inside the turbine scroll 52 and has its rotational force transmitted to the compressor via the coupling shaft 61, thereby driving the compressor.

The turbine wheel 60 is designed such that its outer peripheral edge is located close to the tongue portion 54. Thus, the flow of the exhaust gas swirling around inside the turbine scroll 52 is cut off at the site of the tongue portion 54, and guided toward the turbine lead-out route 53. As a result, the exhaust gas does not stagnate in, but smoothly passes through, the turbine scroll 52. This allows the turbine wheel 60 to turn efficiently under the flow velocity and dynamic pressure of the exhaust gas being introduced into the turbine scroll 52.

As shown in FIG. 6, a right side portion of the turbine housing 50, facing the front side of the turbine wheel 60, has a recessed turbine lead-out space 71 expanding perpendicularly to the axis of rotation A. In the turbine lead-out space 71, opened side by side are a scroll outlet 71*a* communicating with the turbine scroll 52 and a wastegate outlet 71*b* communicating with the wastegate passage 70.

As shown in FIG. 7, assembling a side housing 72 with the turbine housing 50 defines a turbine lead-out route 53 on the right-hand side of the turbine housing 50. An upstream end portion of the turbine lead-out route 53 is defined by the turbine lead-out space 71. The exhaust gas that has been swirled around inside the turbine scroll 52 is introduced through the scroll exit 71*a* into the turbine lead-out space 71 and then discharged through the turbine lead-out route 53 into an exhaust passage (not shown).

As will be described in detail later, the exhaust gas introduced into the turbine lead-in route 51 may sometimes be discharged through the wastegate outlet 71*b* into the turbine lead-out space 71 via the wastegate passage 70. That is to say, the exhaust gas may be directly discharged from the turbine lead-in route 51 into the turbine lead-out route 53 by being bypassed around the turbine scroll 52.

(Turbine Lead-in Route 51)

The turbine lead-in route 51 is a passage through which the exhaust gas released from the respective cylinders C1-C4 is introduced into the turbine scroll 52 via the independent exhaust passages 14, 15, 16 and the upstream exhaust passages 24, 25, 26. The downstream end of the turbine lead-in route 51 is connected to the inlet 55 of the turbine scroll 52. On the other hand, the upstream end of the turbine lead-in route 51 is connected to the respective openings of the low-speed passages 24*c*, 25*c*, 26*c* and high-speed passages 24*b*, 25*b*, 26*b* through the clamp face 21*b*.

As shown in FIG. 2, the exhaust gas passage is formed such that each of the respective exhaust ports 11 running obliquely upward and forward is extended straight from the downstream end of the exhaust port 11 through the downstream end of the turbine lead-in route 51.

As also shown in FIG. 6, a partition wall 56 that partitions the route into upper and lower routes is provided inside the turbine lead-in route 51 extending obliquely upward. This partition wall 56 partitions the turbine lead-in route 51 into a first lead-in route 57 functioning as an inner route for introducing the exhaust gas into the turbine scroll 52 and a second lead-in route 58 functioning as an outer route for introducing the exhaust gas into the turbine scroll 52.

The first lead-in route 57 communicates with, and combines together, all of the low-speed passages 24*c*, 25*c*, 26*c*. Likewise, the second lead-in route 58 communicates with, and combines together, all of the high-speed passages 24*b*, 25*b*, 26*b*.

The exhaust gas is introduced continuously into the first lead-in route 57 irrespective of the engine speed. On the other hand, the exhaust variable valves 22 are provided upstream of the second lead-in route 58, and therefore, the exhaust gas is introduced into the second lead-in route 58 only when the engine speed is equal to or greater than the preset number of revolutions R.

The partition wall 56 is a wall member with an approximately uniform thickness, arranged closer to the upper part of the turbine lead-in route 51, and extends obliquely upward in accordance with the gradient of the turbine lead-in route 51. An inner peripheral wall portion 57*a* corresponding to the upper part of the turbine lead-in route 51 and facing the partition wall 56 of the first lead-in route 57 linearly extends obliquely upward toward a downstream point and parallel to the partition wall 56. A downstream end of the inner peripheral wall portion 57*a* is continuous with the tongue portion 54.

Furthermore, an upstream end of the inner peripheral wall portion 57*a* is continuous with the respective upper parts of the independent exhaust passages 14, 15, 16 and upstream exhaust passages 24, 25, 26. This engine 1 is designed such that the overall upper part of the exhaust passage has a linear cross section. This allows the exhaust gas released from the center of the cylinders C1-C4 to be smoothly introduced through the first lead-in route 57 into the turbine scroll 52. Thus, the exhaust gas introduced into the turbine scroll 52 through the first lead-in route 57 may have its flow velocity and dynamic pressure produce an intended effect on the turbine 5*a* efficiently.

On the other hand, an outer peripheral wall portion 58*a*, corresponding to the lower part of the turbine lead-in route 51 and facing the partition wall 56 in the second lead-in route 58, has a downwardly swelling curved shape approaching the axis of rotation A. The downstream end of the outer peripheral wall portion 58*a* is oriented and biased toward the turbine wheel 60. Thus, the exhaust gas introduced into the turbine scroll 52 through the second lead-in route 58 has its flow guided upward along the outer peripheral wall portion 58*a* and is eventually introduced into the turbine scroll 52 so as to approach the turbine wheel 60. Thus, the exhaust gas introduced into the turbine scroll 52 through the second lead-in route 58 may also have its flow velocity and dynamic pressure produce an intended effect on the turbine 5*a* efficiently.

The vertical widths (i.e., the widths measured in the up and down direction) of the first and second lead-in routes 57 and 58 respectively correspond to that of the low-speed passages 24*c*, 25*c*, 26*c* and that of the high-speed passages 24*b*, 25*b*, 26*b*. The first lead-in route 57 has a smaller vertical width than the second lead-in route 58.

Figure 8:
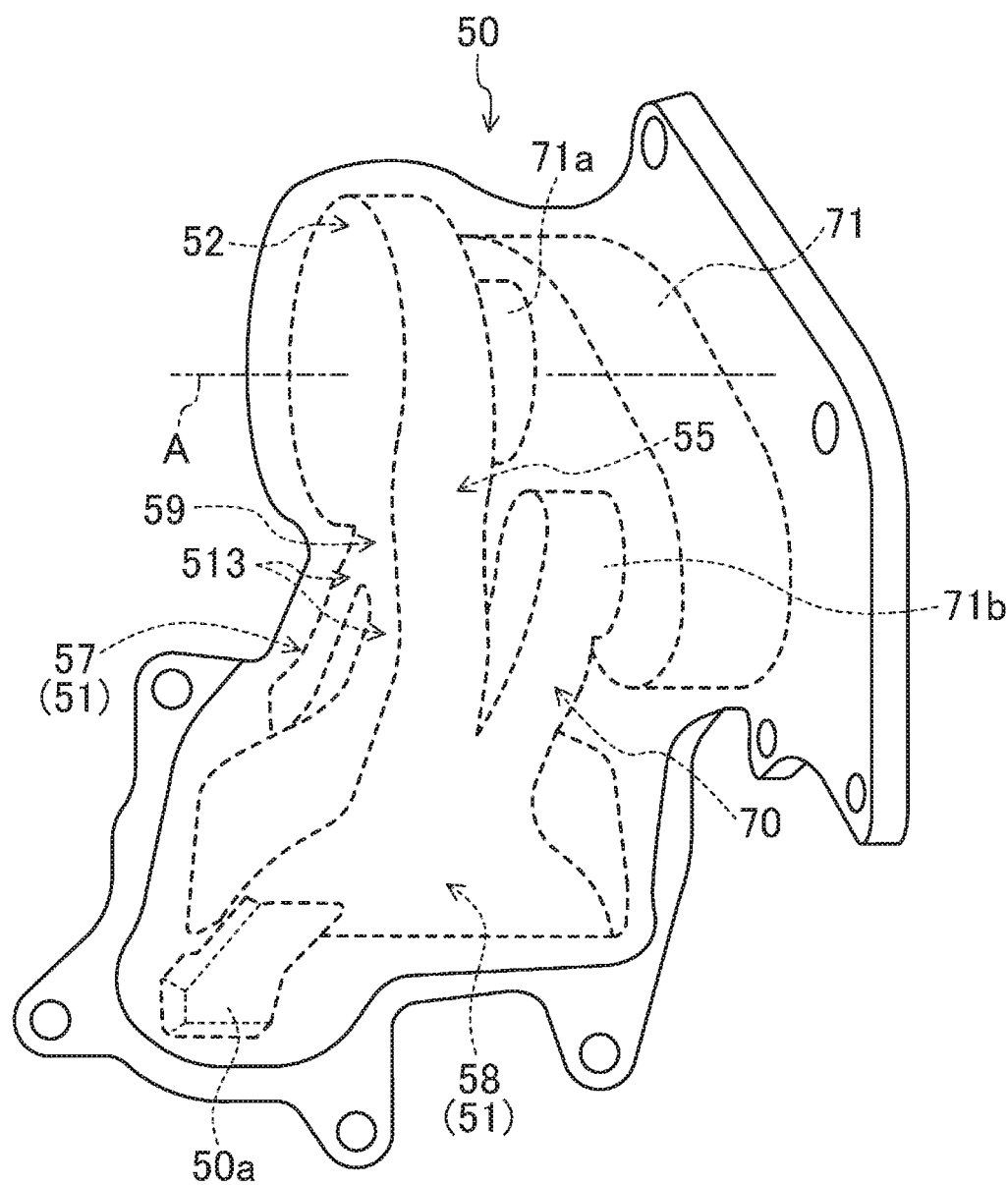
FIG. 8 is a schematic perspective view illustrating the shape of an inner member in the turbine housing.

Also, as shown in detail in FIGS. 7 and 8, the turbine lead-in route 51 has a tapering shape, i.e., its lateral width (i.e., the width measured in the right and left direction of the engine) gradually decreases from an upstream point toward a downstream end. That is to say, the exhaust gas released from the respective cylinders C1-C4 is introduced into the turbine scroll 52 after having passed through such a constricted flow channel.

Specifically, the turbine lead-in route 51 includes a gas combining portion 511, a throat portion 512, and a straight portion 513. The gas combining portion 511 forms an upstream end portion of the turbine lead-in route 51, and has a broader lateral width than any other portion of the turbine lead-in route 51. All of the exhaust gas released from the respective cylinders C1-C4 is combined in this gas combining portion 511.

Specifically, as shown in FIG. 7, the gas combining portion 511 of the second lead-in route 58 (hereinafter referred to as a "second gas combining portion 511") communicates with the respective high-speed passages 24b, 25b, 26b, and the exhaust gas flows running through these three passages 24b, 25b, 26b are combined by the second gas combining portion 511. In the same way, the gas combining portion 511 of the first lead-in route 57 also communicates with the respective low-speed passages 24c, 25c, 26c, and the exhaust gas flows running through these three passages 24c, 25c, 26c are combined by the gas combining portion 511 of the first lead-in route 57.

The throat portion 512 is a portion having a tapering shape and smoothly connected to a downstream portion of the gas combining portion 511. As shown in FIG. 7, the throat portion 512 of the second lead-in route 58 (hereinafter referred to as a "second throat portion 512") has a specially designed shape adapted to the wastegate passage 70.

Specifically, the second throat portion 512 has a pair of symmetric inner surfaces 512a, 512a that are opposed to each other in the right and left direction in which the axis of rotation A extends. The upstream end of each of these inner surfaces 512a is continuous with its associated inner surface 512a of the second gas combining portion 511 and is bent outward so as to have a tapered downstream portion. A downstream portion of each inner surface 512a smoothly connected with an associated one of these upstream ends is bent inward so as to have a tapered downstream portion.

The straight portion 513 is continuous with the throat portion 512 and the inlet 55 of the turbine scroll 52, and has a generally rectangular, substantially constant flow cross section. The exhaust gas flow constricted by passing through the throat portion 512 is rectified by this straight portion 513 and then introduced into the turbine scroll 52 in the optimized condition.

The flow cross section of the respective straight portions 513 of the first and second lead-in routes 57, 58 is set to be smaller than the combined flow cross section of the two exhaust ports 11, 11 communicating with the respective cylinders C. Setting the flow cross section of these straight portions 513 to be smaller than the combined flow cross section of the two exhaust ports 11, 11 communicating with the respective cylinders C triggers the Venturi effect. This promotes the scavengeability of the respective cylinders and enables the exhaust gas to be introduced into the turbine scroll 52 at increased flow velocities, thus allowing the exhaust gas to act on the turbine wheel 60 more efficiently.

Furthermore, a combining portion 59 where the respective straight portions 513 of the first and second lead-in routes 57 and 58 are combined together is provided at the downstream end of the turbine lead-in route 51. In a high-speed operating region where the exhaust variable valves 22 are fully opened, the exhaust gas flows that have passed through the first and second lead-in routes 57 and 58 are combined together at this combining portion 59, and the combined exhaust gas flow is introduced into the turbine scroll 52.

To introduce the exhaust gas into the turbine scroll 52 with good stability and efficiency, no matter whether the exhaust gas is introduced through only the first lead-in route 57 (i.e., in the low-speed operating region) or through both of the first and second lead-in routes 57 and 58 (i.e., in the high-speed operating region), the location of the downstream end of the partition wall 56 defining the combining portion 59 may be determined specifically via experiments, for example More specifically, as shown in FIG. 2, which is a cross-sectional view as viewed in the direction in which the axis of rotation A extends, the downstream end 56a of the partition wall 56 is arranged in line with the axis of rotation A and the tongue portion 54.

(Wastegate Passage 70 and Wastegate Valve 73)

The wastegate passage 70 is a bypass passage allowing the exhaust gas to flow therethrough while being bypassed around the turbine scroll 52 in order to prevent the exhaust pressure from having an excessive impact on the turbine 5a and to prevent an abnormal increase in exhaust gas passage resistance from deteriorating the scavengeability. The wastegate passage 70 is used when the amount of the exhaust gas released becomes equal to or greater than a predetermined upper limit value in the high-speed operating region where the amount of the exhaust gas released is relatively large.

The wastegate passage 70 is used while the exhaust gas is flowing through the second lead-in route 58. Thus, the wastegate passage 70 is provided for the second lead-in route 58 as shown in FIGS. 1, 7, 8, and 9. This allows the excessive exhaust gas to be bypassed around efficiently while preventing the wastegate passage 70 from negatively affecting the exhaust gas flowing through the first lead-in route 57. In addition, the wastegate passage 70 is provided to branch in the right and left direction of the engine. This allows the exhaust gas to be smoothly introduced into the wastegate passage 70 without being significantly diverted, even when the wastegate passage 70 is used (i.e., even when the wastegate valve 73 is opened).

The wastegate passage 70 branches from a downstream portion of the inner surface 512a of the second throat portion 512 and extends obliquely upward in parallel with the straight portion 513. The downstream end of the wastegate passage 70 is arranged in the vicinity of the inlet 55 of the turbine scroll 52 (i.e., in the vicinity of one end thereof closer to the wastegate passage 70) and is provided with a wastegate outlet 71b opening in the direction in which the axis of rotation A extends.

As shown in FIGS. 6 and 7, a wastegate valve 73 is arranged at the wastegate outlet 71b. The wastegate valve 73 is arranged in the turbine lead-out space 71, and is configured to be continuously controllable and switchable from a state of closing the wastegate outlet 71b as indicated by the solid profile in FIG. 7 into a state of opening the wastegate outlet 71b and adjusting its degree of opening as indicated by the phantom profile in FIG. 7, and vice versa, by swinging.

In the high-speed operating region where the amount of the exhaust gas released is relatively large, the respective exhaust variable valves 22 are fully opened to introduce the exhaust gas into the second lead-in route 58. Then, the wastegate valve 73 is opened and closed according to the operating state of the engine. While the wastegate valve 73 is closed, the exhaust gas could ordinarily stagnate in the wastegate passage 70 so much as to produce a turbulent flow of the exhaust gas in the vicinity of its branching point, thus possibly hampering the exhaust gas from being smoothly introduced into the turbine scroll 52.

In this turbine 5a, however, the branching point of the wastegate passage 70 is located in the throat portion 512 upstream of, and rather distant from, the inlet 55 of the turbine scroll 52. That is why any turbulent flow of the exhaust gas produced around the branching point may still be rectified before being introduced into the turbine scroll 52, because the flow channel is gradually constricted.

In addition, in this turbine 5a, the wastegate passage 70 branches from the downstream portion of the inwardly bent inner surface 512a of the second throat portion 512. This allows the exhaust gas flowing through the second lead-in route 58 to be easily guided to the straight portion 513 beyond the branching point.

Specifically, as shown in FIG. 7, a downstream branching portion 70a of the wastegate passage 70 is located one step closer to the downstream end with respect to the inner surface 512a that is located upstream of the wastegate passage 70. In other words, the branching portion 70a located downstream of the wastegate passage 70 is closer to the downstream end than a tangential line S passing through a protruding portion of the inner surface 512a located upstream of the wastegate passage 70. This reduces the influx of the exhaust gas flowing along the inner surface 512a into the wastegate passage 70 and the branching portion's interference with the exhaust gas flow, thus minimizing the production of the turbulent flow. Consequently, the exhaust gas flowing through the second lead-in route 58 is more likely guided to the straight portion 513.

Thus, even if the wastegate passage 70 branches in the vicinity of the turbine scroll 52, the exhaust gas may still be introduced smoothly into the turbine scroll 52.

In this engine, the exhaust variable valves 22 are opened and closed at the preset number of revolutions R, and therefore, the exhaust gas flow changes significantly at that timing. Particularly when the mode is switched from the low-speed operating region to the high-speed operating region, the exhaust variable valves 22 are fully opened to cause a steep increase in the flow cross section of the exhaust gas and allow the exhaust gas to enter the second lead-in route 58 at a time, even though the amount of the exhaust gas released is relatively small.

At that time, the wastegate valve 73 is closed. Thus, the turbulent flow produced by the presence of the wastegate passage 70 would otherwise likely affect the stability of drive of the turbine 5a. This turbine 5a, however, has a structure specially designed to minimize such a turbulent flow, and therefore, may be driven with good stability with the exhaust gas introduced into the turbine scroll 52 smoothly.

Furthermore, the straight portion 513 provided downstream of the throat portion 512 to rectify the constricted exhaust gas flow allows the exhaust gas to be introduced even more smoothly into the turbine scroll 52.

Moreover, the wastegate passage 70 branches from a downstream portion of the second throat portion 512, thus allowing the exhaust gas flows released from the respective cylinders C at different timings to be sufficiently combined with each other at the gas combining portion 511 before reaching the branching point of the wastegate passage 70. Consequently, the turbine may be driven with good stability.

Figure 9:
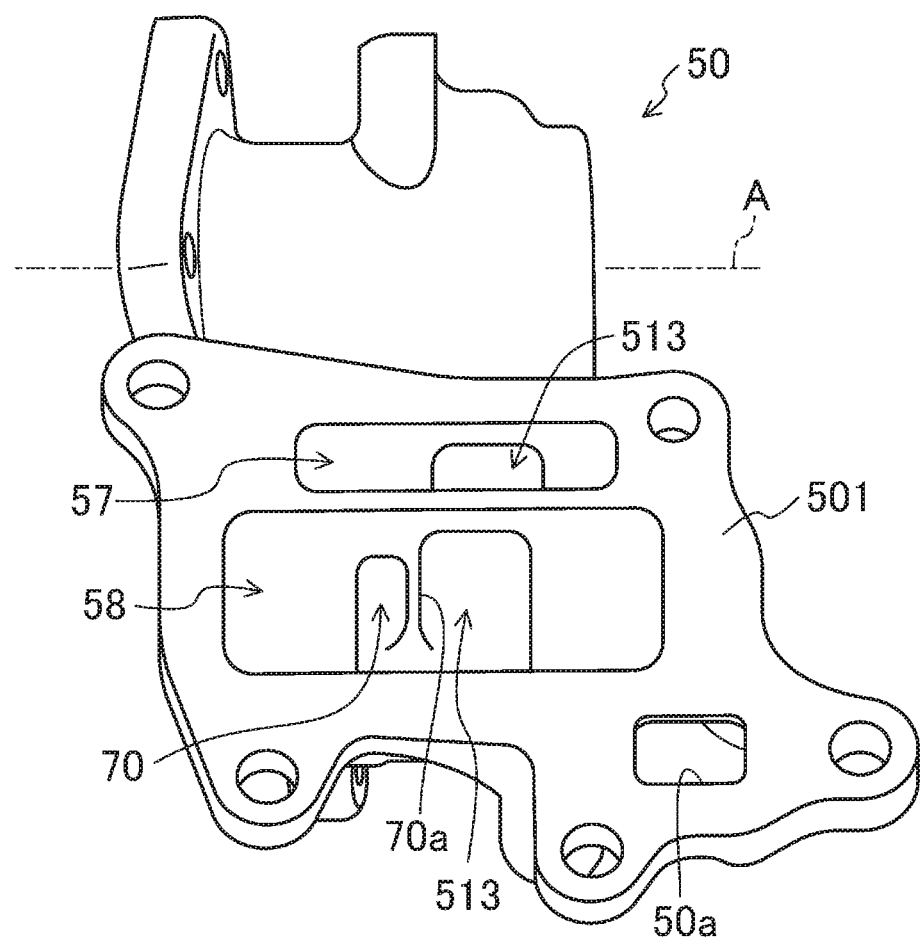
FIG. 9 is a perspective view illustrating the turbine housing as viewed from the engine.

Besides, the wastegate passage 70 extends obliquely upward in parallel with the straight portion 513. Thus, as shown in FIG. 9, the wastegate passage 70 and the straight portion 513 are arranged side by side to face the exhaust gas flow. Consequently, even if the wastegate valve 73 is opened, the exhaust gas may still flow smoothly through both of the wastegate passage 70 and the straight portion 513.

On top of that, the wastegate passage 70 communicates with the turbine lead-in route 53 in the vicinity of the inlet 55 of the turbine scroll 52. This allows the turbine housing 50 to have a reduced size by shortening the overall length of the wastegate passage 70. Furthermore, the wastegate valve 73 is arranged at the wastegate outlet 71b facing the turbine lead-out space 71, thus allowing the turbine housing 50 to be further downsized.

Note that the embodiments of a supercharger described above are only non-limiting exemplary embodiments of the present disclosure. That is to say, various modifications may be made to those described embodiments without departing from the spirit and scope of the present disclosure. In other words, a supercharger according to the present disclosure is readily modifiable to have any of various other alternative configurations. For example, in the embodiment described above, the present disclosure is supposed to be applied to an in-line four-cylinder, four-cycle engine. However, the present disclosure is also applicable to any other types of engines as well. Likewise, detailed configurations of the exhaust valve system 2, turbocharger 5, and turbine housing 50 described above may also be modified according to the specifications required unless those modifications depart from the scope of the present disclosure.

What is claimed is:

1. A supercharger for use in an engine with a cylinder head, and a turbine housing, the turbine housing including a turbine, the turbine comprising:
  a turbine lead-in route into which an exhaust gas released from respective cylinders of the engine is introduced;
  a turbine scroll arranged downstream of, and continuously with, the turbine lead-in route to allow the exhaust gas to swirl around inside;
  a turbine wheel housed in the turbine scroll so as to be turned around an axis of rotation by the exhaust gas;
  a turbine lead-out route communicating with the turbine scroll and allowing the exhaust gas that has left the turbine scroll to flow therethrough;
  a wastegate passage branching from the turbine lead-in route to communicate with the turbine lead-out route and allowing the exhaust gas to flow therethrough while being bypassed around the turbine scroll; and
  a wastegate valve configured to open and close a flow channel of the wastegate passage according to an operating state of the engine, wherein
  the turbine lead-in route includes:
    a gas combining portion arranged at an upstream point to combine exhaust gas flows together,
    a throat portion arranged continuously with the gas combining portion and having a tapered downstream portion, and
    a straight portion that connects an exhaust gas outlet side of the throat portion with an exhaust gas inlet side of the turbine,
  the wastegate passage branches from the throat portion,
  the gas combining portion, the throat portion, and the straight portion are located within the turbine housing, and
  the straight portion has a portion with a constant flow cross section and is arranged continuously with the throat portion.

2. The supercharger of claim 1, wherein
the wastegate passage communicates with the turbine lead-out route in the vicinity of the exhaust gas inlet side of the turbine, and
the wastegate valve is arranged at an outlet of the wastegate passage.

3. The supercharger of claim 1, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

4. The supercharger of claim 1, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

5. The supercharger of claim 1, wherein
the wastegate passage communicates with the turbine lead-out route in the vicinity of the exhaust gas inlet side of the turbine, and
the wastegate valve is arranged at an outlet of the wastegate passage.

6. The supercharger of claim 5, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

7. The supercharger of claim 1, wherein
the wastegate passage is arranged parallel to the straight portion.

8. The supercharger of claim 7, wherein
the wastegate passage communicates with the turbine lead-out route in the vicinity of the exhaust gas inlet side of the turbine, and
the wastegate valve is arranged at an outlet of the wastegate passage.

9. The supercharger of claim 7, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

10. The supercharger of claim 1, wherein
the wastegate passage branches from the downstream portion of the throat portion.

11. The supercharger of claim 10, wherein
the wastegate passage communicates with the turbine lead-out route in the vicinity of the exhaust gas inlet side of the turbine, and
the wastegate valve is arranged at an outlet of the wastegate passage.

12. The supercharger of claim 10, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

13. The supercharger of claim 10, wherein
the wastegate passage is arranged parallel to the straight portion.

14. The supercharger of claim 13, wherein
the wastegate passage communicates with the turbine lead-out route in the vicinity of the exhaust gas inlet side of the turbine, and
the wastegate valve is arranged at an outlet of the wastegate passage.

15. The supercharger of claim 13, wherein
the turbine lead-in route is partitioned by a partition wall into a first lead-in route functioning as an inner route for introducing the exhaust gas into the turbine scroll and a second lead-in route functioning as an outer route for introducing the exhaust gas into the turbine scroll,
an exhaust variable valve is provided upstream of the second lead-in route in order to vary a flow rate of the exhaust gas being introduced into the second lead-in route by changing its flow cross section, and
the wastegate passage is provided for the second lead-in route.

16. A supercharger for use in an engine with a turbine, the turbine comprising:
a turbine lead-in route into which an exhaust gas released from respective cylinders of the engine is introduced;
a turbine scroll arranged downstream of, and continuously with, the turbine lead-in route to allow the exhaust gas to swirl around inside;
a turbine wheel housed in the turbine scroll so as to be turned around an axis of rotation by the exhaust gas;
a turbine lead-out route communicating with the turbine scroll and allowing the exhaust gas that has left the turbine scroll to flow therethrough;
a wastegate passage branching from the turbine lead-in route to communicate with the turbine lead-out route and allowing the exhaust gas to flow therethrough while being bypassed around the turbine scroll; and
a wastegate valve configured to open and close a flow channel of the wastegate passage according to an operating state of the engine, wherein
the turbine lead-in route includes:
a gas combining portion arranged at an upstream point to combine exhaust gas flows together, a throat portion arranged continuously with the gas combining portion and having a tapered downstream portion, and a straight portion that connects an exhaust gas outlet side of the throat portion with an exhaust gas inlet side of the turbine, the wastegate passage branches from the throat portion, and the straight portion is arranged on a central axis of an outlet of the wastegate passage when the wastegate passage is viewed from the side.

17. A supercharger for use in an engine with a turbine, the turbine comprising:
    a turbine lead-in route into which an exhaust gas released from respective cylinders of the engine is introduced;
    a turbine scroll arranged downstream of, and continuously with, the turbine lead-in route to allow the exhaust gas to swirl around inside;
    a turbine wheel housed in the turbine scroll so as to be turned around an axis of rotation by the exhaust gas;
    a turbine lead-out route communicating with the turbine scroll and allowing the exhaust gas that has left the turbine scroll to flow therethrough;
    a wastegate passage branching from the turbine lead-in route to communicate with the turbine lead-out route and allowing the exhaust gas to flow therethrough while being bypassed around the turbine scroll; and
    a wastegate valve configured to open and close a flow channel of the wastegate passage according to an operating state of the engine, wherein
    the turbine lead-in route includes:
        a gas combining portion arranged at an upstream point to combine exhaust gas flows together,
        a throat portion arranged continuously with the gas combining portion and having a tapered downstream portion, and
        a straight portion that connects an exhaust gas outlet side of the throat portion with an exhaust gas inlet side of the turbine,
    the wastegate passage branches from the throat portion,
    a central axis passing through an outlet of the wastegate passage is perpendicular to a central axis passing through the straight portion, and
    the straight portion has a portion with a constant flow cross section and is arranged continuously with the throat portion.

* * * * *